United States Patent

[11] 3,532,144

| [72] | Inventor | James E. Halvorson |
| | | Box 55, Dallas, Wisconsin 54733 |
| [21] | Appl. No. | 712,488 |
| [22] | Filed | March 12, 1968 |
| [45] | Patented | Oct. 6, 1970 |

[54] EGG PROCESSING MACHINE
16 Claims, 16 Drawing Figs.

| [52] | U.S. Cl. | 146/2 |
| [51] | Int. Cl. | A47j 43/14 |
| [50] | Field of Search | 146/2.4, 2, 2.5 |

[56] References Cited

UNITED STATES PATENTS

| 2,229,349 | 1/1941 | Sigler | 146/2 |
| 3,444,909 | 5/1969 | Sol | 146/2 |
| 3,448,782 | 6/1969 | Williams | 146/2 |

*Primary Examiner*—W. Graydon Abercrombie
*Attorney*—Alex Lagaard

ABSTRACT: An egg processing machine including an egg opening means having an egg conveyor receiving and progressing the eggs, shell cracking means cracking the shells in halves, shell separating means for separating the halves of the shells, shell turning means for turning the eggs with the open portions lowermost and shell spreading means for spreading apart the halves of the shells to drain the egg fluids in the shells therefrom. The egg processing machine further includes egg fluid separating means including an egg fluid conveyor extending transversly of the egg conveyor and having pans pivoted to said fluid conveyor and receiving the fluid drained from the shells, said pans having sloping sides and are tilted by pan tilting means to remove the most fluid portions of the albumen from the yolks and detaching means for detaching the portions of the albumen adhering to the yolk sack. The egg processing machine still further includes undesirable eggs, broken yolk eliminating means and pan washing means.

Patented Oct. 6, 1970

INVENTOR.
JAMES E. HALVERSON
BY
Alex. Lagaard
ATTORNEY

EGG PROCESSING MACHINE

FIELD OF THE INVENTION

The instant invention relates to the process of egg opening and separation and to egg cutters and separators.

PRIOR ART

In the prior art the egg separators are very complicated, requiring constant care and attention. In addition the cost is high and the performance of the machines is not positive, resulting in loss of the egg liquid as well as the inclusion of egg shells in the drained egg liquid.

SUMMARY OF THE INVENTION

With applicant's invention large quantities of eggs are quickly opened and drained and the albumen separated from the yolks. Also broken yolks as well as undesirable egg liquids and albumen are separated from the clear albumen and whole yolks and the fluid receiving recepatacles washed as desired.

SPECIFICATION

In the drawings:

FIG. 1 is a plan view of the entire machine.

FIG. 15 is a sectional detail view of the pan holding means taken on line 15–15 of FIG. 6A and drawn to a greater scale.

The egg processing machine constituting the herein disclosed invention consists of an egg conveyor B supported on an egg conveyor frame A. Operating in conjunction with this conveyor is an egg shell opening device C comprising an egg shell cracking means D which acts from above and forms a circular crack about the shell medially of the ends thereof and divides the shell into two halves. Egg shell separating means E separates the halves of the cleft egg shell and severs the egg shell lining throughout the front portion thereof but leaving part of the lining at the back portion intact to serve as a hinge for the halves of the shell. A substantial portion of the egg liquid is drained from the cleft egg shell upon spreading of the egg shell halves. As the cleft egg is advanced by the conveyor B, egg turning means F rotates the egg bringing the opening in the shell lower most. Egg shell spacing means G maintains the halves of the shell apart leaving the remaining egg liquids to drain out the shell and to drop through the conveyor B. The egg processing machine further consists of an egg-liquid separator K cooperating with an egg-liquid conveyor I mounted on an egg-liquid conveyor frame H. On this conveyor are pans J which receive the egg fluid discharged from the cleft eggs on conveyor B. The egg-liquid separator K removes the free flowing portion of the albumen from the egg fluid when the pans are in one position and when in another position detaches the albumen adhering to the yolk sack. The egg processing machine further includes pan selecting means M which permits of selecting pans having undesirable eggs, eggs with broken yolks and causing them to be separately discharged from the conveyor. Discharge guide means N collects the separated portion of the egg-liquid and directs the same to suitable container. Pan stacking means O causes the pans to lie with their bottoms substantially horizontal to permit tilting of the pans while in the upper run of the conveyor and maintaining them inverted while in the lower run so as to allow washing of the same while inverted with washing means P. The operation of the machine is controlled by control means S. A rotten egg detecting means Q permits locating of and removing pans containing rotten eggs. The conveyors A and I are driven by drive means T.

Figures 2, 14:
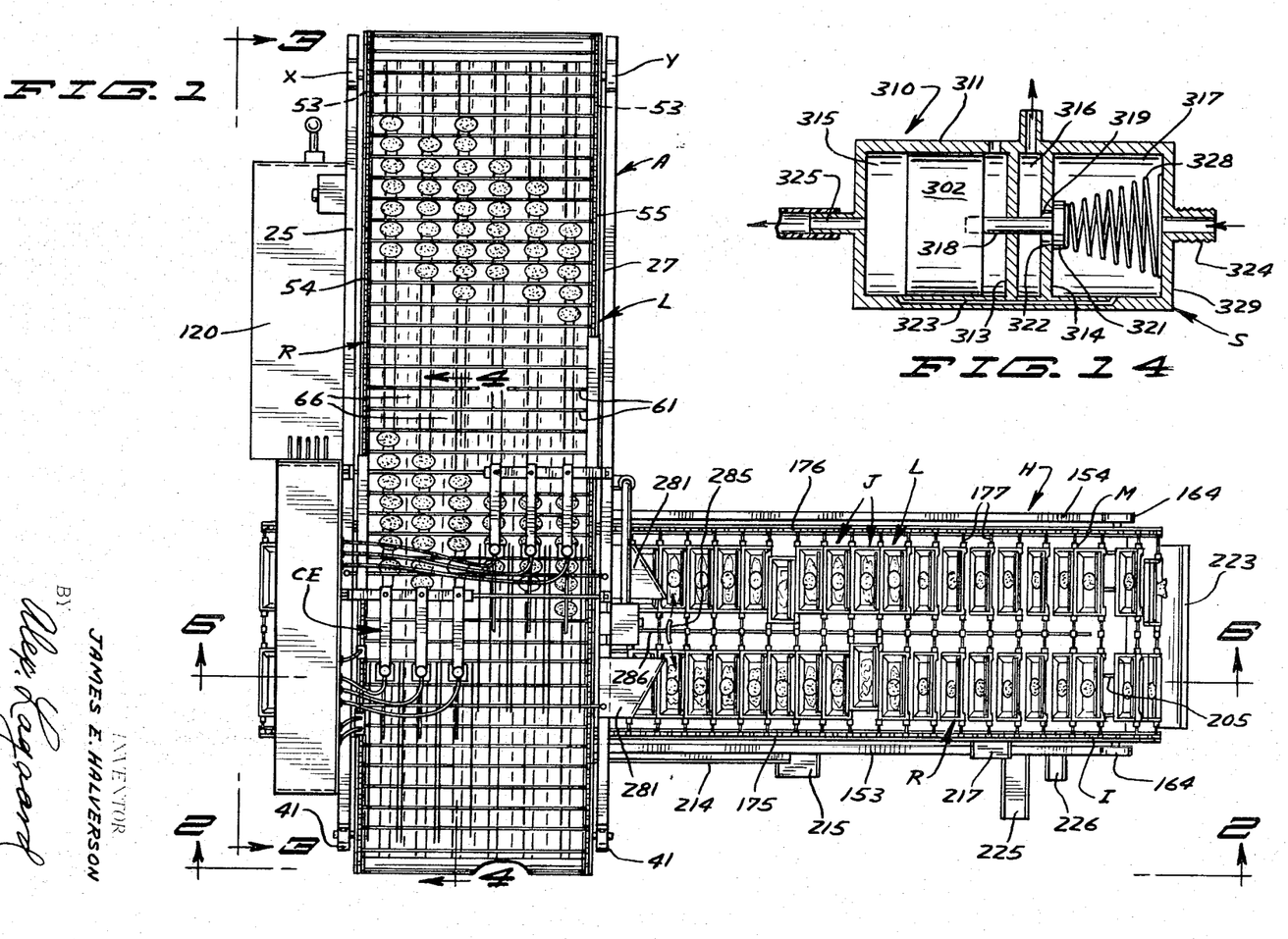
FIG. 2 is an end elevational view of the entire machine, taken substantially on line 2–2 of FIG. 1.
FIG. 14 is a sectional view of the air control.
Figure 2:
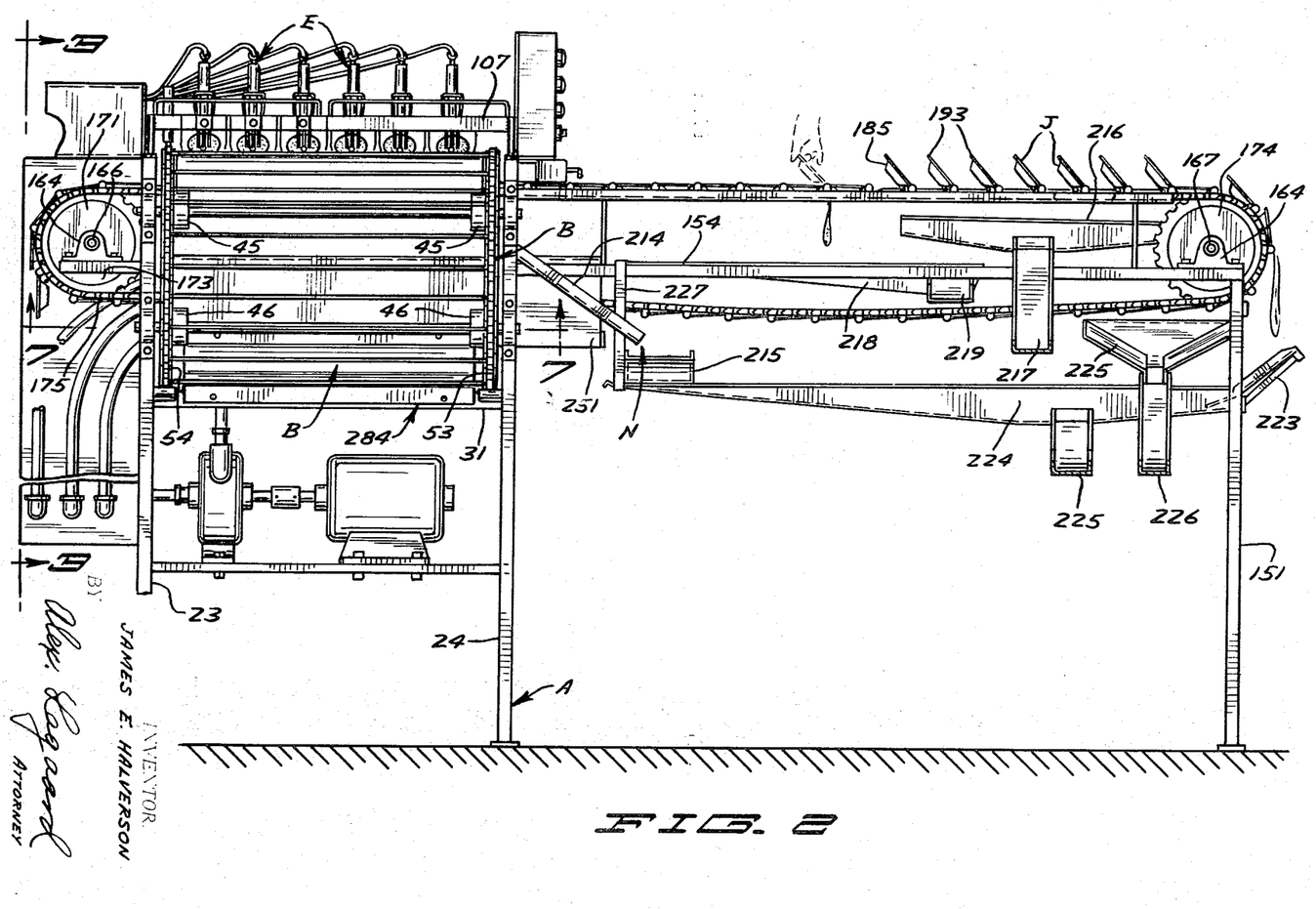
Figure 3:
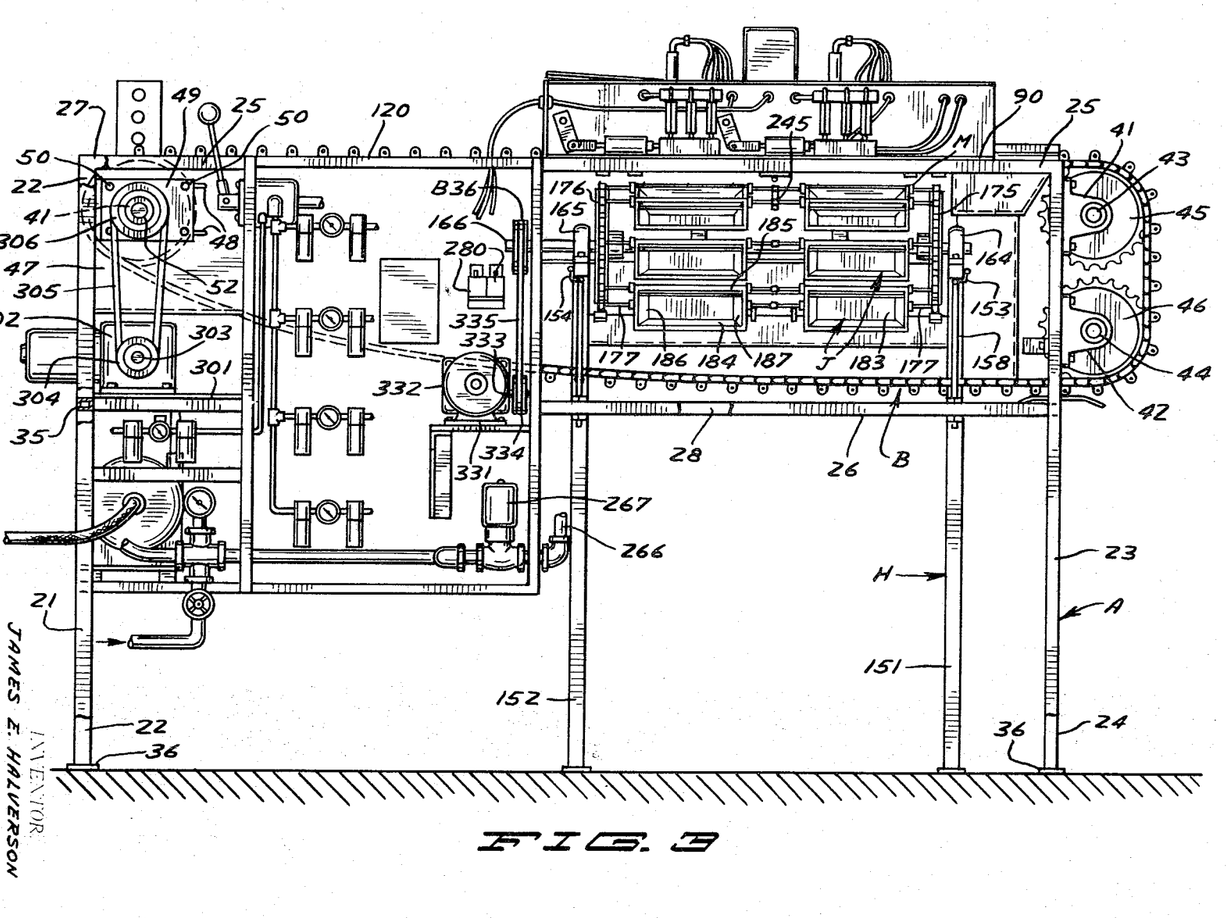
FIG. 3 is a side elevational view of the entire machine taken substantially on line 3–3 of FIG. 1.

Frame A is best shown in FIGS. 2 and 3 and comprises front legs 21 and 22 and rear legs 23 and 24. The legs 21 and 23 are connected together by an upper longitudinal frame member 25 and a lower frame member 26. In a similar manner the legs 22 and 24 are connected together by means of an upper longitudinal frame member 27 and by means of a lower longitudinal frame member 28. In addition the legs 23 and 24 are connected together by means of a cross frame member 31 while legs 21 and 22 are connected together by means of a cross frame member 35. All of the legs and frame members are made of square metal tubing welded together with the legs resting on feet 36.

EGG CONVEYOR

Figures 10, 11, 12, 13:
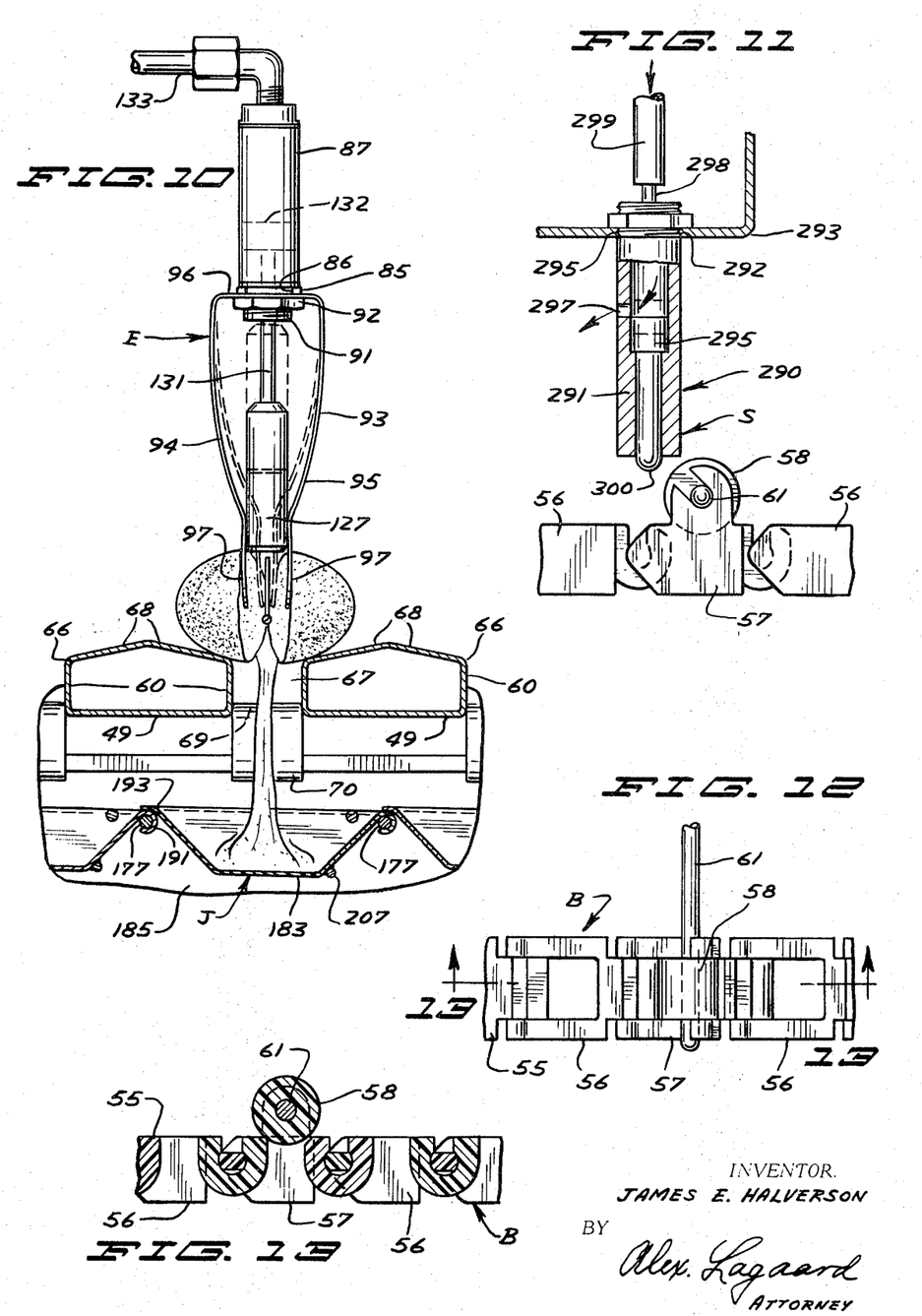
FIG. 10 is an elevational sectional view of the egg shell separator taken on line 10–10 of FIG. 8 and drawn to a greater scale than FIG. 8.
FIG. 11 is an elevational sectional view of the cam and cam follower of the invention.
FIG. 12 is a plan view of a section of one of the chains.
FIG. 13 is a sectional view of the chain taken on line 13–13 of FIG. 12.

The egg conveyor C is best shown in FIGS. 1, 3, 4, 5, 6A, 12 and 13. Attached to the legs 23 and 24 by bolts 40 are upper bearings 41 and lower bearings 42. Journaled in these bearings are shafts 43 and 44 which support spaced sprocket wheels 45 and 46, one at each end of each shaft. Attached to the legs 21 and 22 and frame members 25 and 27 at the upper ends of the same and on the inner surfaces thereof are plates 47 which are formed with slots 48. Overlying these plates are other plates 49 adjustably attached thereto by means of bolts 50 which pass through the plates 49 and through the slots 48 in plates 47. The plates have attached to them bearings 41 in which is journaled a shaft 52, corresponding to the shaft 43 and disposed at the same height. This shaft 43 has mounted on it sprocket wheels 53 similar to and corresponding with the sprocket wheels 45. Extending about the sprocket wheels 45, 46 and 53 on the right hand side of the frame A is a chain 54 and extending about the sprocket wheels 45, 46 and 53 on the left hand side of said frame is a chain 55. These chains have pivoted links 56 and 57 as shown in FIGS. 1, 2 and 13 and the links 57 have bosses 58 extending outwardly therefrom. Received in the corresponding bosses of each chain are rods 61 which extend transversely of the conveyor and across the space between the chains.

By means of the arrangement of sprocket wheels the conveyor B has an upper run 62 and a lower run 63. The chains of the run 62 are received in channels 64 attached to cross bars 65 which in turn are attached to the upper longitudinal frame members 25 and 26 of frame A and guide the chains for horizontal movement with the bosses 58 extending above the channels.

Extending across the upper longitudinal frame members 25 and 27 and disposed beneath the same as shown in FIG. 10 are the cross bars 65 and to which are attached longitudinally extending guides 66 which are spaced from one another to form slots 67 therebetween. These guides are formed with inclined tops 68 along which the eggs roll, said eggs being engaged by the rods 61 and propelled thereby in the direction indicated by the arrow in FIG. 1. They are also formed with depending sides 60, and inturned bottoms 49, resting on the bars 65.

The conveyor B is of a sufficient width to progress six columns of eggs. The machine is divided into two sections each adapted to process three columns of eggs whereby the capacity of the machine may be doubled. These sections are indicated by the reference characters R and L, the conveyor B handling the eggs for both sections. Since both sections are substantially the same, only the parts of section R will be described in detail.

EGG SHELL CRACKING MEANS

Figure 4:
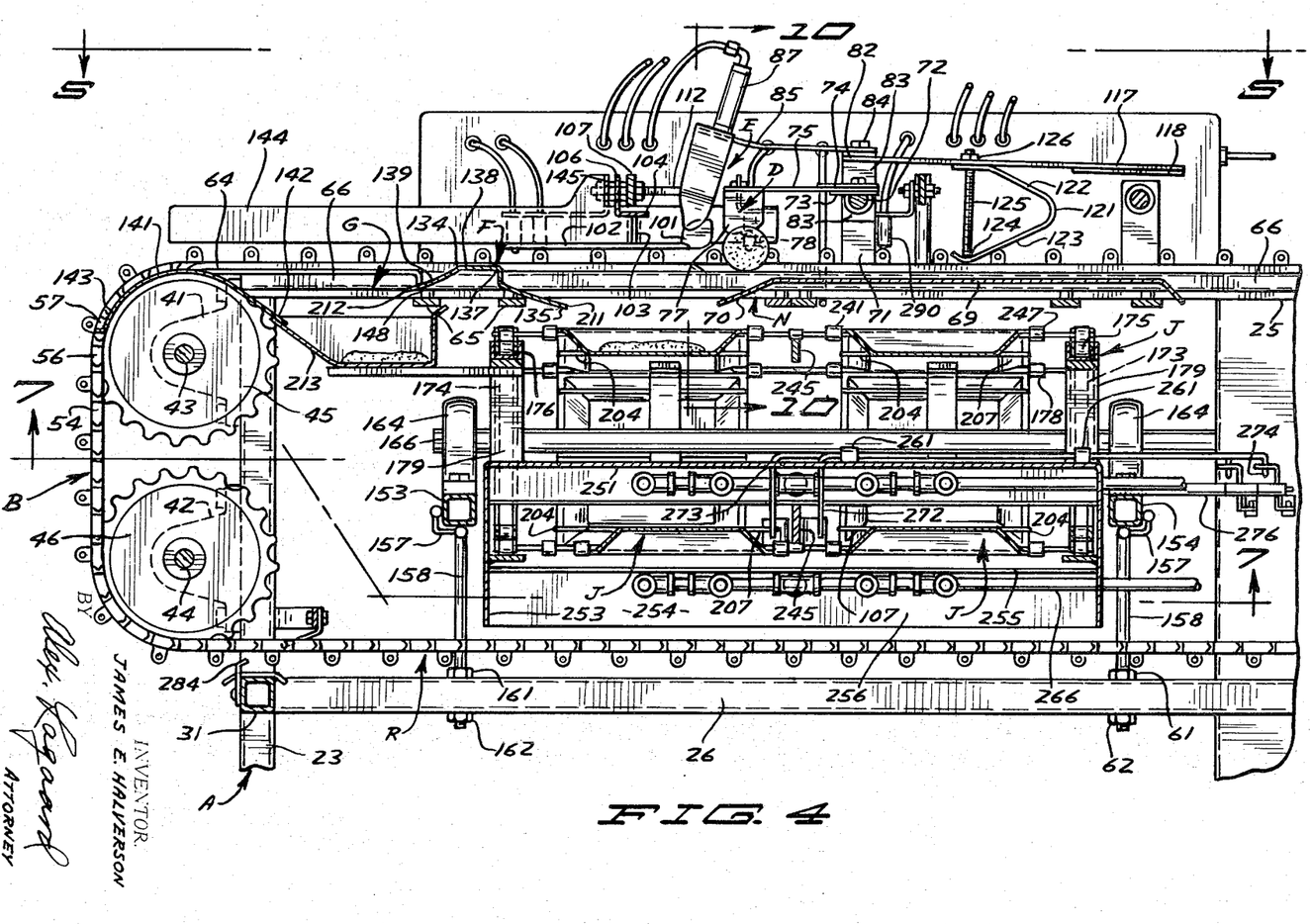
FIG. 4 is a longitudinal sectional elevational view through the egg opening means of the machine taken on line 4–4 of FIG. 1.
Figure 8:
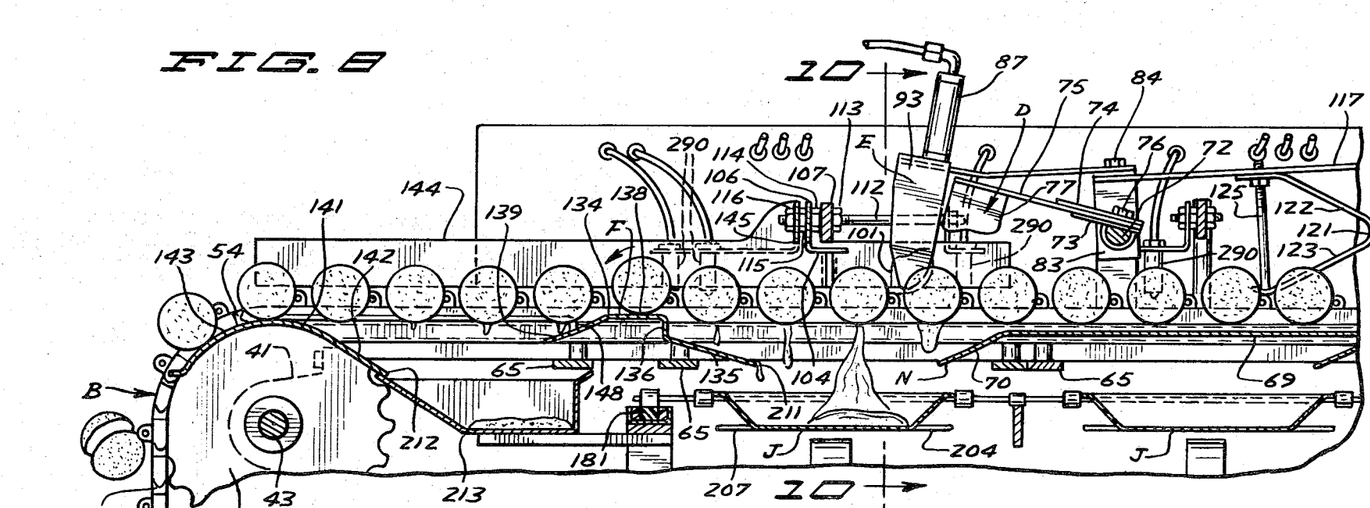
FIG. 8 is a longitudinal elevational sectional view of the egg opening device of the machine drawn to a greater scale than FIG. 5 and taken on line 8–8 of FIG. 6A and FIG. 5.
Figure 9:
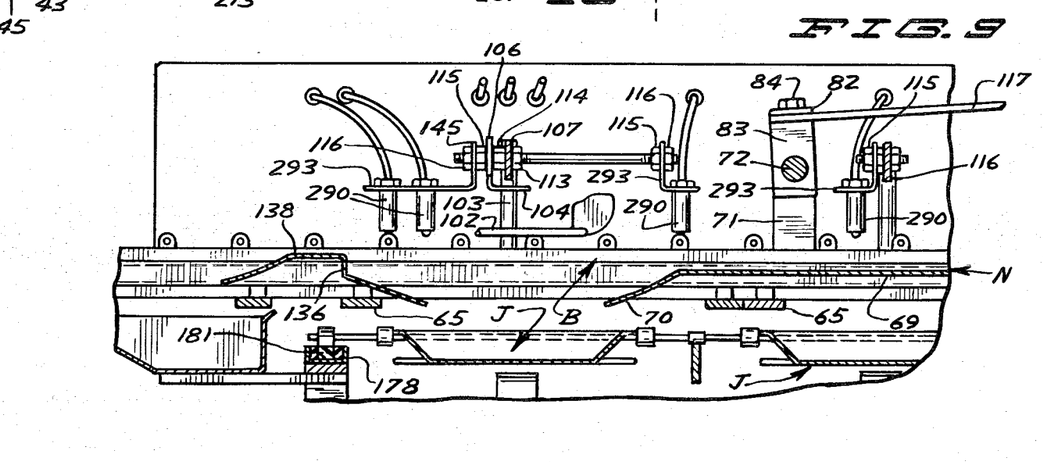
FIG. 9 is an elevational sectional view taken on line 9–9 of FIGS. 6A and 5 and drawn to the same scale as FIG. 8.

One egg shell cracking means C is employed for each column of eggs and is best shown in FIGS. 4 and 8. Extending upwardly from the two longitudinal frame members 25 and 27 are two standards 71 which are drilled to form bearings for a transverse shaft 72. Each egg cracking device includes a plate 73 which overlies the shaft 72 and is welded thereto. A second plate 74 overlies plate 73 and is spaced therefrom to receive therebetween a flat longitudinal spring 75 which is disposed above the column of eggs which it cracks. A cap screw 76 extends through plate 74, the springs 75 and plate 73 and is screwed into the shaft 72 to rigidly hold said spring at one end attached to the shaft. Attached to said springs at the outer ends thereof is a cleaver 77 which is in the form of a flat blade having a sharpened arcuate edge 78 conforming to the curvature of the eggs. The shaft 72 outwardly of the standard 71 has a depending arm 79, FIG. 5, which when rocked in one direction raises the cleaver and when rocked in the opposite direction causes the cleaver to strike the egg with a snap action producing an arcuate crack in the eggs thus dividing them into halves. The cleaver is then quickly withdrawn. The arm 79 is connected to the piston rod 80 of a cylinder 81 having a piston therein not shown. This cylinder is attached by means of a strap 89 to a shelf 90 which is attached to the frame A.

SHELL SEPARATING MEANS

The shell separating means D is best shown in FIGS. 4, 5, 8 and 10, and comprises a transverse bar 82 having depending legs 83. These legs are drilled to provide bearings to receive the shaft 72 and support the bar 82 for rocking movement on the said shaft independently of the movement of the shaft in operating the cleavers 77. This bar has attached to it by means of bolts 84 an arm 85 which is disposed above the spring 75 and beyond the cleaver 77. This arm at the ends thereof is formed with a slot 86, FIG. 10. A cylinder 87 has a reduced threaded portion 91 which extends through said slot and which has nuts 92 screwed on the same. The shell separating means includes inverted M-shaped spreader 93. This spreader is constructed of spring material and has fingers 94 and 95 connected together by means of a connecting portion 96. The connecting portion 96 of the spreader 93 has a slot 86 in it which receives the reduced portion 91 of cylinder 87 and a nut 92 screwed on said reduced portion of the cylinder clamps it to the arm 85. The fingers 94—95 of the spreaders 93 are normally bent so that the tips 97 of the same are close together whereupon said tips may enter the cracks in the eggs shells.

The egg shell separating means further includes a thin sharpened blade 101 which is attached to a longitudinally extending rod 102. This rod has welded to it an upright 103 which is welded to the lower leg 104 of an angle member 105. Adjacent the upper leg 106 of angle member 105 is a cross bar 107 which is mounted on posts 111 secured to the frame members 25 and 27. The bar 107 has extending through it a threaded rod 112 which has screwed on it nuts 113, 114, 115 and 116. The rod 112 is clamped to the bar 107 by means of nuts 113 and 114, while the upper leg 106 of angle member 105 is clamped in position between nuts 114 and 115. The leg 106 is slotted to permit of vertical adjustment of blade 101.

The egg separating means E is moved into and out of the egg shell by means of the bosses 58 on the links 57 of the chain 54 which serve as cams. Attached to the bar 82 is a single rearwardly extending bar 117 which has attached to it at one end a weight 118 and at its other end the upper member 122 of a V-shaped arm 121. The lower member 123 of this arm is provided with a cam follower 124 which is adapted to engage the cams 58 to raise the bar 117 and lower the fingers 94 and 95 into the cracks formed in the egg shells by the cleaver 77. The arm 121 is constructed of a somewhat resilient material and the two members 122 and 123 may be spread apart or brought together by means of a threaded rod 125 which is screwed into member 122 and engages the cam follower 124. A lock nut 126 on the rod 125 holds the same in adjusted position.

The fingers 94 and 95 of the M-shaped spreaders 93 are normally urged into contact with the blade 101 through the resiliency of the material from which they are constructed. For spreading them apart to separate the halves of the eggshells a plunger 127, FIG. 10, is employed which is disposed between the fingers 94 and 95 and is connected to a piston rod 131 which in turn is connected to a piston 132 operating in cylinder 87. Upon a fluid under pressure being directed into the cylinder 87 through tube 133 the tips 97 are moved to the positions shown in full lines in FIG. 10.

The slots 67 between the guides 66 are closed by means of a strip of metal 69 secured to the guides 66. This strip terminates at the egg shell cleaver 77 and has a downwardly inclined end 70. The space between the guides 66 is open for a short distance beyond the end 70 to permit the egg liquid leaving the egg shells to drain into the pans J, disposed on the egg liquid conveyor I which lies beneath the upper run of egg conveyor B extending at right angles thereto.

EGG SHELL TURNING MEANS

Figure 5:
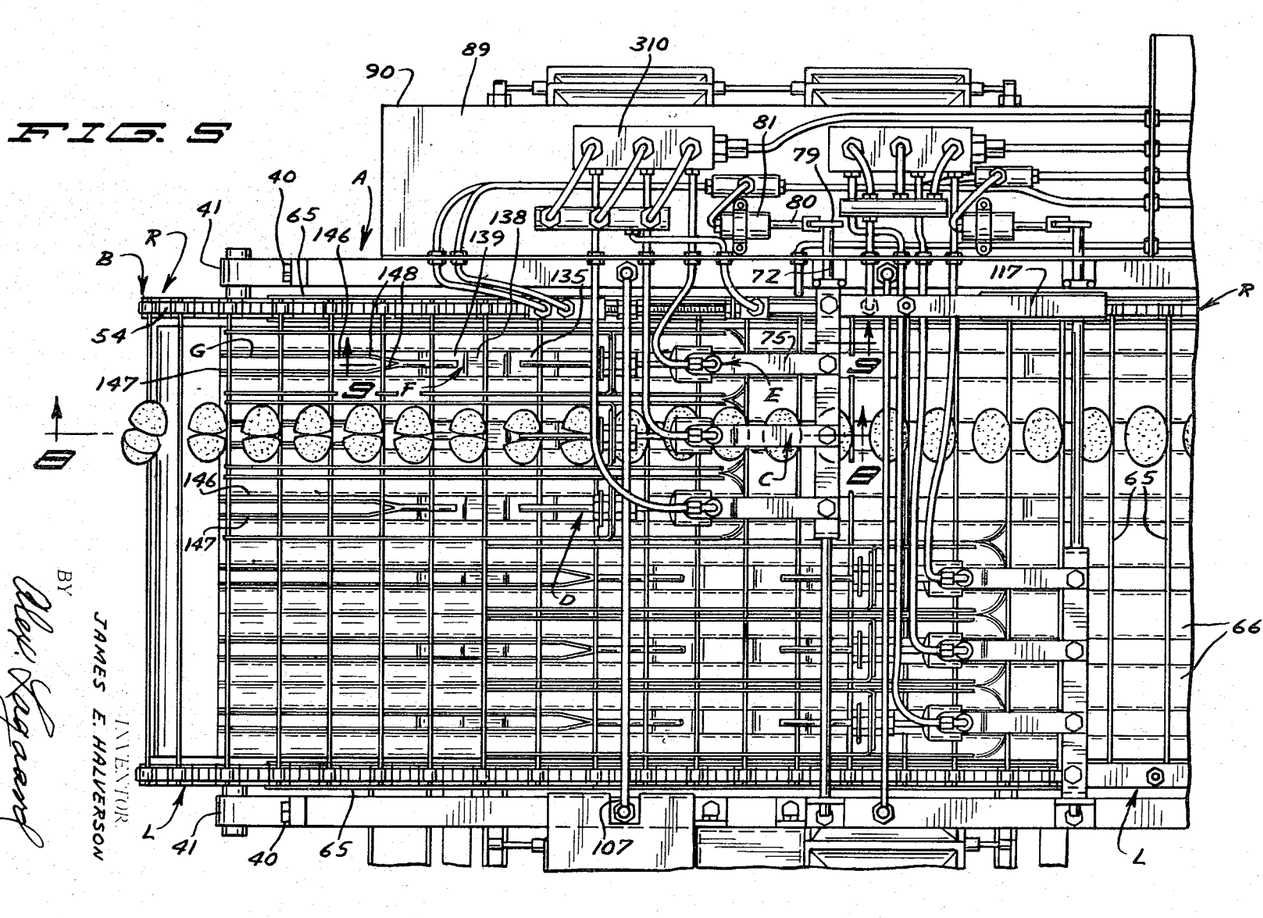
FIG. 5 is a plan view of a portion of the egg opening and shell spreader device of the invention drawn to a greater scale than FIG. 1.

In order to drain any albumen which might remain in the egg shell halves, egg shell turning means F is provided which is best shown in FIGS. 5 and 8. This means consists of a strip 134 of sheet metal of the same width as the width of the slots 67 between the guides 66. This strip has a forward end 135 inclined upwardly and meeting a riser 136. A short runway 138 issues rearwardly from the riser 136 and is formed with a rounded corner 137 at its forward end which the egg shells engage as approaching the runway and by which they are raised on to the runway. As the egg shells reach the runway they commence to roll and when leaving the runway the formerly open fronts have been turned lowermost allowing the final remaining liquid in the egg shell halves to drain out of the same.

The spaces 67 between the guides 66 following runways 138 are open and an inclined end 139 issuing from each runway 138 directs the egg-liquid into said space. Another strip of metal 141 having a downwardly inclining forward end 142 is located in each of the spaces 67 at the localities of the sprocket wheels 45 and has a curved portion 143 conforming to the curvature of the sprocket wheels 45 and from which the egg shells are discharged.

To maintain the egg shells in their respective channels, elongated partitions 144 are employed which extend along the centers of the guides 66. These partitions have outwardly turned flanges 145 through which the threaded rods 112 extend and are clamped in place by means of the nuts 115 and 116 on said rods.

EGG SPACING MEANS

The egg spacing means G is best shown in FIGS. 4 and 5. This means consists of two spaced rods 146 and 147 for each column of eggs which have converging ends 148 welded together and bent downwardly to form posts 148 secured to the rear most cross bar 65 of the frame A. These rods are parallel to one another, and are disposed at a height above the bottoms of the egg shells so that they engage the egg shell halves between the same as they pass along the guides 66.

EGG-LIQUID CONVEYOR FRAME

The egg-liquid conveyor frame H is best shown in FIGS. 2, 4, 6A and 6B and includes two legs 151 and 152 which are located at the discharge end of conveyor I. Attached to the upper ends of these legs are two spaced longitudinal frame members 153 and 154. These frame members are held in spaced relation by means of two cross frame members 155 and 156. All of the frame members are welded together. The frame members 153 and 154 extend completely through the space between the upper run 62 and the lower run 63 of conveyor B and outwardly beyond the chains 54 and 55 of said conveyor. The longitudinal frame members are supported relative to the frame A by means of two saddles 157 which are mounted on posts 158 which extend through the longitudinal frame member 26 of frame A as shown in FIG. 4. These posts are threaded at their lower ends and nuts 61 and 62 screwed thereon adjustably support the frame members 153 of frame H relative to the frame A for movement in an up and down direction.

EGG-LIQUID CONVEYOR

The egg-liquid conveyor I is best shown in FIGS. 2, 3, 4, 6A and 6B. Attached to the upper surfaces of the longitudinal frame, members 153 and 154 of the conveyor H are bearings 164 and 165. Journaled in these bearings are shafts 166 and 167 which have mounted on them sprocket wheels 171, 172, 173 and 174. Passing about the sprocket wheels 171 and 172 is a right chain 175 and passing about the sprocket wheels 173 and 174 is a left chain 175. These chains are similar to the chains 54 and 55 and have pivoted links 56 with bosses 58 extending outwardly therefrom as shown in FIGS. 12 and 17. Extending across these bosses are rods 177 which serve to support the pans J as will be presently described. The conveyor I similar to conveyor B has an upper run 181 and a lower run 182, the chains 175 and 176 of the upper run 181 of the conveyor I running in channels 178 while said chains along the lower run 182 of said conveyor run on bars 169, said channels and bars being secured to the frame H.

PANS

The pans J are best shown in FIGS. 3, 4, 6A and 6B. These pans are each constructed from sheet metal and are formed with a bottom 183, a sloping front side 184, a sloping rear side 185 and sloping ends 186 and 187 as shown in FIG. 3. These pans have spaced hooks 191 formed at the upper leading edges of the front walls 184 of the pans and which are adapted to hook over the rods 177 of the conveyor to permit of swinging movement of the same to permit of movement from one position shown in FIG. 6B to the other and vice versa. When the centers of the pans are at the quarter points of the rods 177 the hooks 191 lie opposite reduced portions 199 of said rods and may be unhooked therefrom to disengage the pans from the same as shown in FIG. 15. The pans J have flanges 193 issuing from the upper trailing edges of the rear walls 185 which are parallel with the bottoms 183 of said pans. The pans J are of such a width that the flange 193 of each pan rests upon the hooks 191 of the following pans.

EGG-LIQUID SEPARATOR

Figure 6A:
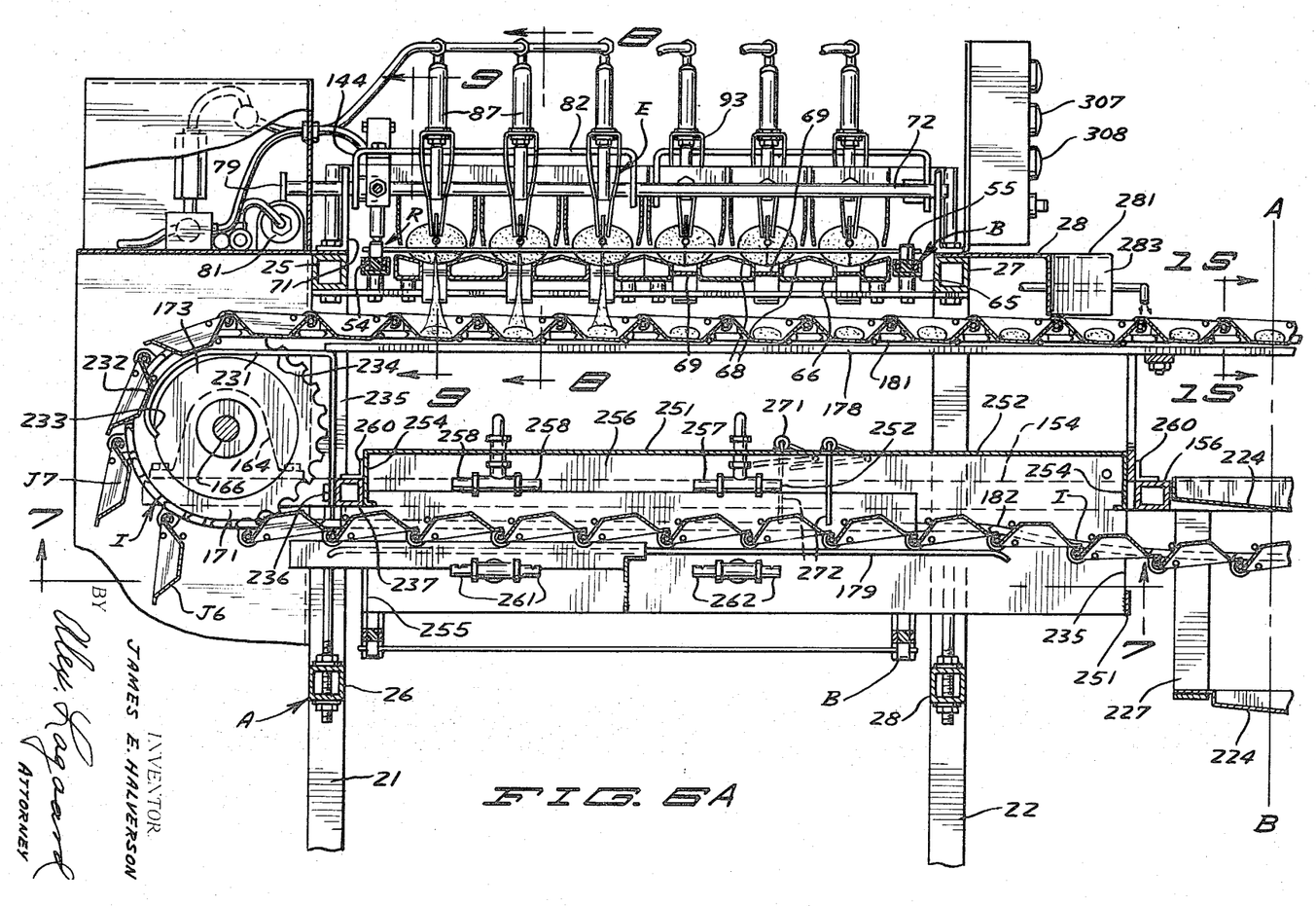
FIG. 6A is an elevational sectional view of the receiving end of the egg-liquid separating device drawn to greater scale than FIG. 1 and taken on line 6–6 of FIG. 1.
Figures 6B, 7:
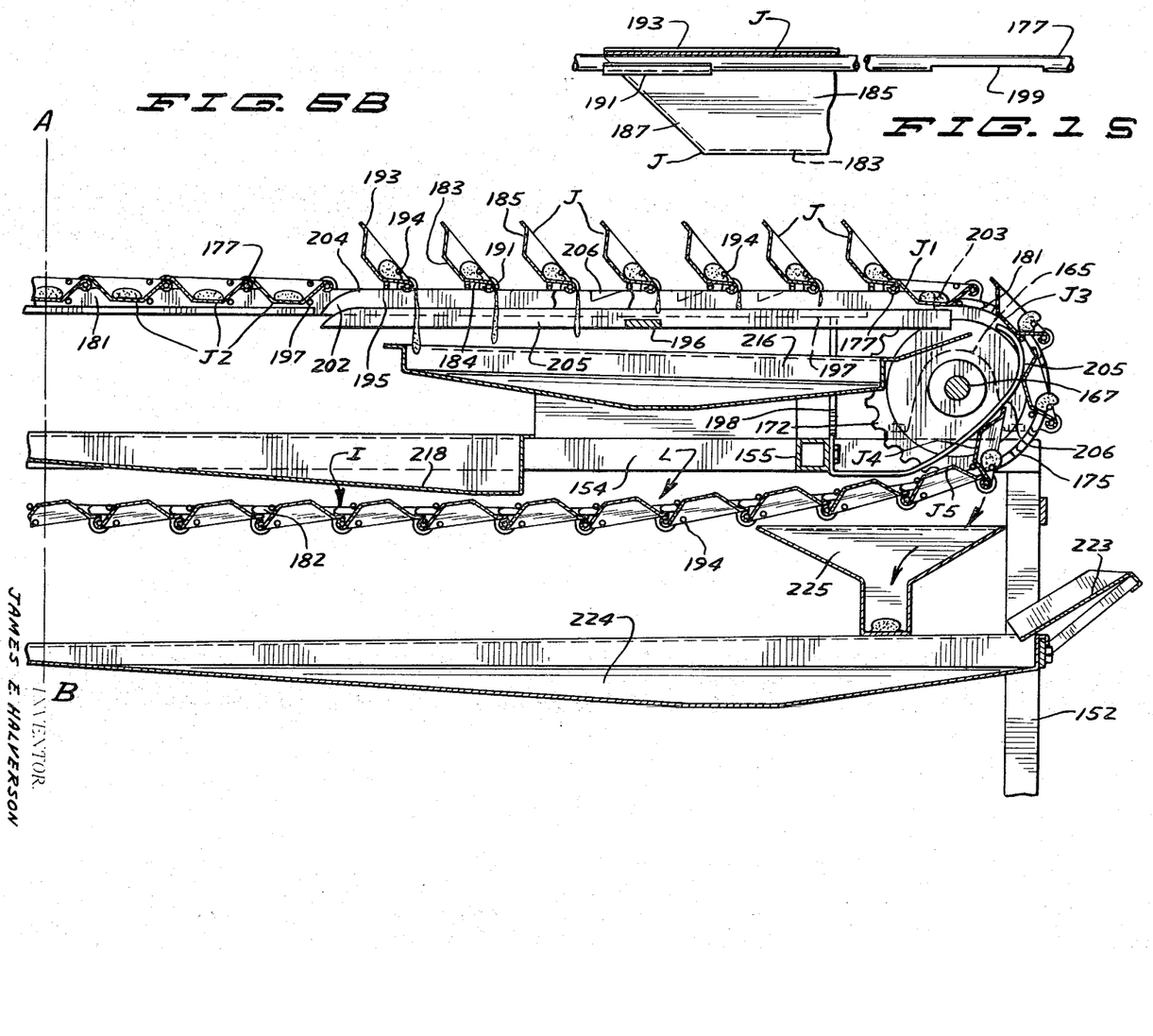
FIG. 6B is a view similar to FIG. 6A of the discharge end of the egg-liquid separating device drawn to the same scale as FIG. 6A and taken on line 6–6 of FIG. 1.
FIG. 7 is an inverted view of the egg-liquid separating device and pan washing means drawn to the same scale as FIG. 6A and taken on line 7–7 of FIG. 6A.
Figure 7:
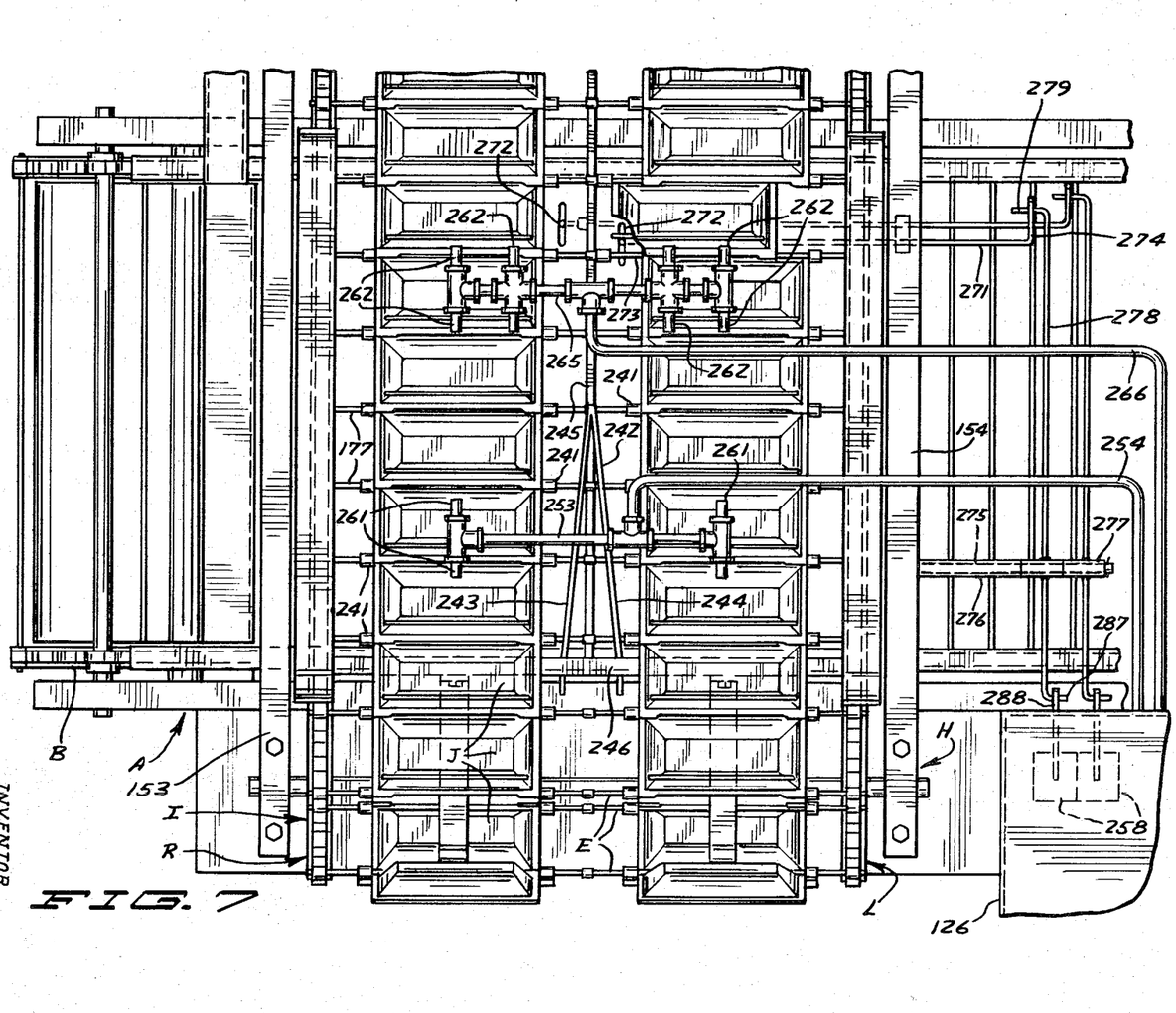

The egg-liquid separator K is best shown in FIG. 6B. Separation of the albumen of the eggs from the yolks of the eggs is accomplished by tilting the pans J as shown in FIG. 6. A rod 194 extends across the two ends 186 and 187 of each pan and is secured thereto. This rod is spaced from the side 184 at a distance sufficient to form an obstruction preventing discharge of the yolk from the pan when the pan is inclined as shown in connection with the upper run 181 of conveyor I. A space is left between said rod and side to allow the albumen to flow out of the pan. The tilting of the pans is accomplished by means of an elongated cam 195, which is welded to a cross bar 196. This cross bar is attached to two longitudinal bars 197 which are supported on legs 198 attached to the longitudinal frame members 153 and 154 of frame H. While the cam 195 and supporting structure therefor is shown in FIG. 6B for the left section of the conveyor I, it will be readily comprehended that the same construction is employed for the right-hand section. The cam 195 has a sloping end 202 and a square end 203 and is engaged by cam followers 204, depending from the forward portions of the pans J to tilt the pans. The cam 195 has notches 206 in the same which form successive inclined surfaces in the same which serve to jog the pans to separate the albumen from the egg yolks.

In addition to the cam 195 another cam 205 is employed which is welded to the crossbar 155 of frame A. This cam engages another cam follower 207 at the other end of the pan. The cams 195 and 202 are spaced apart far enough so that only one or the other of said cam followers can engage its companion cam at one time.

PAN SELECTING MEANS

The pan selecting means M is best shown in FIGS. 1, 3 and 6B. As will be noted in FIGS. 1, 3 and 4, the length of the pans J is less than half the width of the space between the chains 175 and 176. This permits of sliding the pans along the rods 177. Movement of the pans toward the center disengages the cam followers 207 from the cam 195 and prevents tilting of the pans J. At the same time cam followers 204 engage cam 205 and are held in horizontal positions. Pan J1 as shown in FIG. 6A has been so moved and as will be noted lies substantially horizontal the same as the pans J2 toward the left of the cam 195. A pan so positioned commences to discharge when reaching the position indicated by pan J3 in FIG. 6B thus discharging the entire contents of the eggs outwardly beyond the conveyor. The yolks of the eggs in the other pans however do not discharge at such position of the pans due to the obstructing rods 177, but commence to discharge after having left the positions indicated by the pans J4 and have fully discharged when reaching the positions indicated by the pans J5. By this construction an operator watching the pans as they emerge from conveyor B can move the pan containing broken undesirable eggs and move them toward the center thus preventing the mixing broken or undesirable eggs with the clear albumen.

For the purpose of returning the pans to normal positions collars 241 are employed which are slidable on the rods 177. Engaging these collars is a V-shaped wedge 242 having two members 243 and 244 diverging outwardly and situated between the collars 241 of both sections of the conveyor I. This wedge has attached to it a longitudinal spacer 245, extending throughout the length of the conveyor and which limits the sliding movement of the pans out of cam engaging positions. The wedge 242 is welded to a cross bar 246 attached to the longitudinal conveyor frame members 153 and 154. Other collars 247 on the rods 177 limit the outward movement of the pans J.

DISCHARGE GUIDE MEANS

The egg-liquid drained from the egg shells is collected by the discharge guide means N and is shown in FIGS. 1, 2, 3, 4, 6A and 6B. Funnels 211, FIG. 8, are formed by means of the sloping tops 68 of the guides 66, the downwardly extending sides 60 of said guides, the stops 69 therebetween and the turned down ends 135 of the runways 138. These funnels direct the egg-liquid directly into the pans J on conveyor I.

Similarly funnels 212 are formed by the tops 68 of the guides 66, the sides of said guides, the downwardly sloping ends 139 of ramps 138 and the downwardly turned ends 142 of the strips of metal 141. These funnels direct the egg-liquid leaving the eggs after being turned over into a trough 213 extending transversely of the conveyor. Another trough 214, FIG. 2 receives the discharge from trough 213 and discharges it into still another trough 215 which leads it from the machine and to a suitable container.

The albumen of the eggs is discharged from the conveyor I by tilting the pans J and flows through the spaces between pans to a hopper 216. From this hopper it is led by a trough 217 to a suitable container.

The yolks of the eggs leave the trays J when the trays are in the position of tray J5 as shown in FIG. 6B. The released yolks are deposited in a hopper 225 and led therefrom by means of a trough 226 to a suitable container.

The undesirable egg-liquid may be removed as follows. In advance of the cam 195 the pans J are all horizontal. If undesirable egg-liquid is discovered, the good egg pan ahead of it is raised and the contents is emptied into the preceding tray having good eggs, leaving a space between it and the tray carrying the undesirable egg liquid. The tray carrying the undesirable egg-liquid is then manually raised and the contents of it discharged between the space left between it and the preceding raised tray and into a hopper 218. From this hopper the egg-liquid flows by means of a trough 219 out to a suitable container, or if desired removed from the conveyor I.

Egg-liquid with broken yolks is discharged over the discharge end of conveyor I and onto a trough 223 which directs it into a hopper 227. A trough 225 leading from said hopper directs the liquid with broken egg yolks to a suitable receptacle. Hopper 224 is supported by a hanger 227 secured to frame members 153 and 154.

PAN STACKING MEANS

The pan stacking means O is best shown in FIGS. 6A and 6B and comprises for each column of pans a cam 231 having an arcuate portion 232, a curved tip 233, a tangential portion 234 and a depending leg 235. This leg is attached by means of a bolt 236 to a cross bar 237 which in turn is welded to the frame members 153 and 154. When the pans J reach the sprocket wheels 171 and 173 the same hang as indicated with pans J6 and J7 in FIG. 6A. As the chains 175 and 176 turn over these sprocket wheels the pans are turned by the arcuate portion 232 until the flanges 193 overlie the outer surfaces of the hooks on the following pans, thereby permitting the pans to be tilted in the manner shown in FIGS. 2 and 6B.

As the chains 175 and 176 pass over the sprocket wheels 172 and 174 the pans J follow the cams 205 until they reach the position reached by pan J5 in which the flanges on the pans fall on the inner surfaces of the hooks on the following pans, thus being held from dropping.

PAN WASHING MEANS

The pan washing means P is best shown in FIGS. 4, 6A and 7. A hood 251 encloses the lower run L' of conveyor I at the receiving end of said conveyor. This hood is provided with a top 252, side walls 253 and end walls 254. The hood 251 is connected to the frame members 237 and 156 by means of angle members 26B. These end walls have slots 255 therein and through which the lower run L' of conveyor I runs. The walls of hood 151 extend below the pans J forming a confined space 256 below said run opening downwardly. The hood 251 is supported by the longitudinal frame members 153 and 154. In the space 256 and below the run are located two sprays 261 for each section of the conveyor which are disposed under the pans and direct water upwardly to wash the pans. These sprays are located midway between the ends of the pans when the pans are in their outermost positions. These sprays are connected together by means of piping 263, the feed pipe 264 of which is connected to a suitable source of water under pressure. The sprays 261 are used for general cleaning of all of the pans after an extended run and the conveyor I operated continuously during the washing operation so that all of the pans are washed.

In the space 256 are located four sprays 262 for each section of the conveyor I which are used solely for washing individual trays which may have become soiled by carrying egg liquid containing broken egg yolks or undesirable egg-liquid. All of these sprays are connected together with piping 265, the feed pipe 266 of which is connected by a solenoid operated valve 267 to a suitable source of water under pressure.

The sprays 262 are operated while the conveyor I is operating. For this purpose the following described linkage is employed. Pivoted in bearings 261, FIG. 4, attached to the hood 251 is a shaft 271. This shaft has a depending lever 272 at its inner end which extends through an opening 273 in the top 252 of hood 251. This lever is in a position to be engaged by the cam followers 207 when the pans J are in their innermost positions. The outer end of the shaft 271 is formed with a depending arm 274 which is disposed exteriorly of said hood 251. Extending outwardly from the frame member 154 of frame H is a stub shaft 275 which has a spacer sleeve 276 mounted on it and which extends up to the frame member 154. In addition a hub 277 is swingably mounted on said stub shaft and has welded to it a longitudinally extending rod 278. This rod is formed with an arm 279 which is adapted to be engaged by the arm 274 on shaft 271. The other end of rod 278 has a hook 287 on it which is hooked into the operating lever 288 of a microswitch 280. This switch is mounted in a cabinet 120 secured to the frame A on the right hand side thereof. When the shaft 271 is rotated by means of arm 272 engaging cam follower 207, arm 274 raises the arm 279 and swings to rod 278 on shaft 275, thus operating switch 280. This switch energizes solenoid 267 to turn on the water to nozzles 262.

Other spray nozzles 257 and 258 are disposed above the lower run 182 of conveyor I and beneath the top 252 of hood 251. These nozzles clean the undersides of the pans and operate in conjunction with nozzles 261 and 262.

As the egg-liquid drains into the pans J it occasionally occurs that the albumen of the egg-liquid is discharged upon and remains upon the flanges 193 of the said pans to cause it to drop into the pans, a scraper 281 is employed for each section of conveyor I and which is best shown in FIG. 1. This scraper is angular in form, FIG. 6A having a flange 282 which is secured to frame member 26 of frame A and a blade 283 depending therefrom and which rides on the flanges 193. The blade 283 is set on an angle so as not to catch on the edges of the flanges 193 of said pans.

Egg-shells are discharged from the discharge end of conveyor A over the strip of metal 141 and dropped from the curved end 143 into a suitable container. Occasionally eggshells get stuck to the pans J and are not discharged therefrom. To free such egg shells a scraper 284 is employed which is attached to the transverse frame members 31 as shown in FIG. 4.

ROTTEN EGG DETECTING DEVICE

The rotten egg detecting device Q is shown in FIG. 1. Between the two scrapers 281 is arranged a transverse tube 285 open at its ends. This tube has connected to it a feeder tube 286 which is connected to a suitable supply of air under pressure. The tube 285 is located slightly above the pans J and blows the fumes from the rotten eggs outwardly toward operators stationed on each side of conveyor I. When a rotten egg is detected the machine is stopped and the pan containing the rotten egg is removed and said pan and other contaminated parts of the machine thoroughly cleaned before replacing the pan and starting the machine.

CONTROL MEANS

The control means S includes a bleeder switch 290 shown in FIG. 11. This switch comprises a vertical cylinder 291 having a reduced threaded end 292. This end is received in a hole 295 in a bracket 293 attached to the frame A of conveyor B. A lock nut 294 screwed on the end 292 of the cylinder 291 holds the same attached to the bracket 193. Slidably mounted in the cylinder 291 is a piston 295 which has a piston rod 296 projecting through the lower end of the same. In the side wall of the cylinder is a bleeder hole 297 and at the upper end is an air inlet tube connector 298 which has attached to it a hose 299 connected to a source of air under pressure. The piston rod 296 has a curved lower end 301 which serves as a cam follower and is adapted to engage the bosses 58 on the chains 44 and 45 and which serve as cams. When the cam follower 301 is raised the bleeder hole 297 is closed and pressure builds up in the cylinder chamber which is utilized as will be presently described.

The control means S further includes an air control 310 which comprises a cylinder 311. In the cylinder 311 are two partitions 313, 314, which form three chambers 315, 316, and 317 in said cylinder. A floating piston 312 is mounted in chamber 315 in said cylinder. This piston has a piston rod 318 which passes through partition 313 and through a valve opening 319 in partition 314. At the end of rod 318 is a valve head 321 which engages a valve seat 322 formed on the underside of partition 314. This construction serves a valve indicated in its entirety by the reference numeral 320 between chamber 317 and chamber 316. A bleeder passageway 323 connects chamber 317 with chamber 315 above piston 302. An inlet 324 is connected to a source of air under pressure and communicates with chamber 317. An outlet 325 communicates with the air bleeder switch 290 and an air escape passageway 326 communicates with the portion of chamber 315 below piston 302 and the atmosphere. An outlet 327 communicates with chamber 316 and with one of the various cylinders of the machine. A spring 328 acting between the valve head 321 and the lower end 329 of cylinder 311 returns said valve head to closed position when the bleeder switch opens.

There is one bleeder switch 290 and one air control 310 for each of the spreader cylinders 87 and the egg cracker cylinders 81.

DRIVE MEANS

The drive means T is best shown in FIG. 3. Mounted on the frame members 26 and 35 of frame A is a shelf 301. Resting on this shelf is an electric motor with gear reduction 302 having a drive shaft 303. A pulley 304 is mounted on this drive shaft and a belt 305 passing over this pulley and another pulley 306 on shaft 52 drives the conveyor A. In a similar manner a shelf 301 is disposed in cabinet 120. Resting on this shelf is an electric motor with gear reduction 332 having a drive shaft 333. A pulley 334 is mounted on this drive shaft and a belt 305 passing over this pulley and another pulley 336 on shaft 166 drives the conveyor I. The two motors 302 and 332 are operated by switches 307 and 308 mounted in a switch box 309 attached to longitudinal frame member 27 of frame A. Wiring for the motor circuits being conventional has not been shown.

I claim:
1. An egg processing machine comprising:
 a. an egg shell opening device and
 b. an egg-liquid separating device
 c. said egg shell opening device including
 d. an egg conveyor having
 e. endless egg progressing means by which the eggs are progressed with their axes extending transversely of the direction of travel of the eggs and along
 f. spaced longitudinal guides
 g. said progressing means having upper and lower spaced runs
 h. said guides being disposed beneath the upper run in the space between said runs
 i. egg shell cracking means disposed above the upper run of said progressing means and forming arcuate cracks in the egg shells concentric with the axes of revolution thereof, and dividing the shell into halves
 j. egg shell separating means separating the halves of the egg shells and causing the egg-liquid to discharge through an opening between said guides and into said egg-liquid separating device.

2. An egg processing machine according to claim 1 in which:
 a. the egg-liquid separating device includes
 b. an egg-liquid conveyor disposed between the upper and lower runs of the egg conveyor and below said guides for conveying the egg-liquid discharged thereon laterally of the egg conveyor.

3. An egg processing machine according to claim 1 in which:
 a. the endless egg progressing means comprises
 b. spaced chains with
 c. pivoted links having,
 d. transverse rods connected to corresponding links of said chains and engaging the eggs and causing them to roll along said guides.

4. An egg processing machine according to claim 1 in which:
 a. the egg-liquid conveyor comprises
 b. spaced chains with
 c. pivoted links having
 d. transverse rods connected to corresponding links of said chains and
 e. pans carried by said rods and receiving the egg-liquid discharged through the opening between said guides of the egg conveyor.

5. An egg shell opening device comprising:
 a. egg conveyor means having,
 b. endless egg progressing means by which the eggs in columnar arrangement are progressed with their axes of revolution extending transversely of the direction of travel of the eggs and along
 c. spaced longitudinal guides,
 d. said progressing means having upper and lower spaced runs
 e. said guides being disposed beneath the upper run in the space between said runs,
 f. an egg shell cracking means disposed above the upper run of said progressing means and forming arcuate cracks in the upper portions of the egg shells concentric with the axis of revolution thereof,
 g. egg shell separating means following the egg shell cracking means and disposed above the egg progressing means and having
 h. spreading blades insertable into the eggs at the localities of the cracks therein, and
 i. spreading means for spreading certain of said blades apart for opening the eggs to allow the egg-liquid to flow out of the shell and through an opening between the guides.

6. An egg shell opening device according to claim 5 in which:
 a. the cracking means includes a transverse shaft having a spring cleaver arm extending outwardly therefrom and overlying an egg to be cracked,
 b. a thin cleaver on said arm having
 c. an arcuate sharpened edge for engagement with the egg shell and forming therein an arcuate crack in the egg shell concentric with the axis of revolution of the egg
 d. a motion producing arm on said shaft and
 e. motion producing means for periodically operating said arm when an egg appears beneath said cleaver.

7. An egg shell opening device according to claim 6 in which:
 a. the egg progressing means comprises
 b. two spaced chains having
 c. pivoted links and with
 d. rods extending across the space between the chains and attached to certain corresponding links to receive an egg
 e. cams formed on certain of said links,
 f. a cam follower adapted to engage said cams and
 g. said motion producing means being actuated by said cam and engaging said motion producing arm for oscillating said shaft and swinging said cleaver toward and from the eggs passing by said cleaver.

8. An egg shell opening device according to claim 7 in which:
 a. the motion producing means comprises
 b. a cylinder piston unit operated by fluid pressure and having
 c. a piston rod connected to said motion producing arm
 d. and a valve controlling the flow of fluid to said cylinder and operated by said cam and cam follower.

9. An egg shell opening device according to claim 5 in which:
   a. the egg shell separating means comprises a pair of movable blades having tips normally in contact and adapted to be jointly inserted into the eggs at the cracks formed by the cleaver and
   b. spreading means operating in conjunction with said blades for spreading the blades apart and at the same time spreading the halves of the egg shell apart to allow the egg liquid to flow from the egg shell.

10. An egg shell opening device according to claim 9 in which:
    a. the egg shell separating means includes
    b. a fixed blade straddled by the movable plates, and a rod extending forwardly thereof and maintaining the halves of the egg shell apart.

11. An egg shell opening device according to claim 5 in which:
    a. the portions of the spreading blades are arranged in converging relation and the
    b. spreading means consists of a plunger engaging said portions of the blades.

12. An egg shell opening device according to claim 5 in which:
    a. the egg shell spreading means is supported by
    b. supporting means pivoted to allow entry of the spreading blades into the cleft egg shells or to allow removal of said blades therefrom.

13. An egg shell opening device according to claim 12 in which:
    a. the egg progressing means has
    b. cams corresponding with each egg in the column and
    c. a cam follower carried by said pivoted supporting means and engaging said cams to procure the denoted movement of the spreading blades.

14. An egg shell opening device according to claim 9 in which:
    a. the egg shell separating means additionally includes
    b. a short runway between the guides on which the egg shells roll to bring the open portion of the egg shell lowermost to further facilitate draining of the portion of the albumen left in the egg shells after being acted upon by the shell spreading means.

15. An egg shell opening device according to claim 5 in which spacing means are provided following the egg shell separating means for maintaining the eggshells spaced as the same travel along a portion of the upper run on the conveyor following the egg cracking means.

16. An egg shell opening device according to claim 15 in which:
    a. the spacing means has
    b. a wedge shaped spearhead serving to spread apart the halves of any egg shells which may have been brought together after being turned over.